May 10, 1938.  R. C. BLAYLOCK ET AL  2,116,860
AUTOMATIC GUN CHARGER
Filed April 27, 1935  3 Sheets-Sheet 1
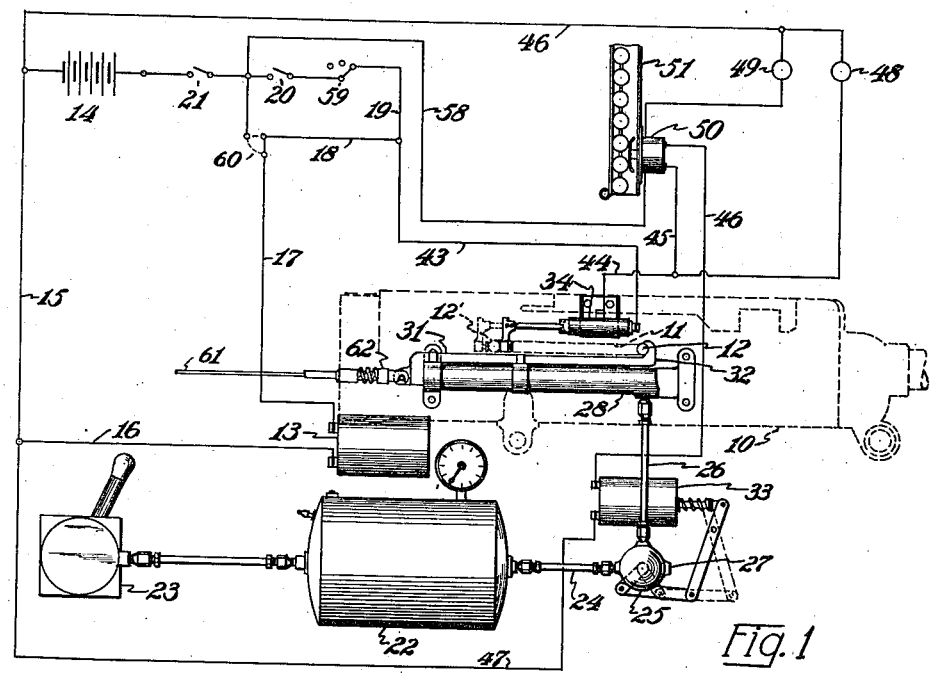
Fig. 1.
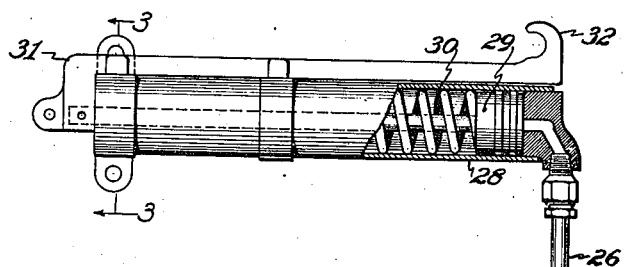
Fig. 2.
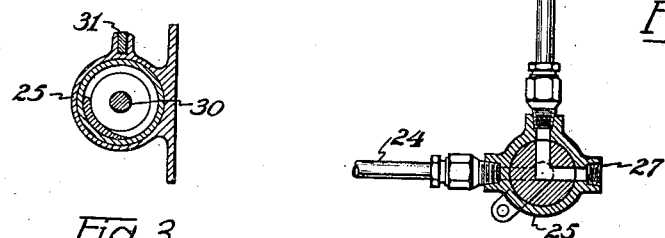
Fig. 3.
INVENTORS
RAYMOND C. BLAYLOCK &
CLEM G. TRIMBACH
BY
ATTORNEY Patented May 10, 1938

2,116,860

UNITED STATES PATENT OFFICE 2,116,860

AUTOMATIC GUN CHARGER

Raymond C. Blaylock, Kenmore, and Clem G. Trimbach, Eggertsville, N. Y., assignors, by mesne assignments, to Curtiss-Wright Corporation, a corporation of New York Application April 27, 1935, Serial No. 18,568

12 Claims. (Cl. 89—1)

This invention relates to aircraft armament, and is particularly concerned with provision of devices for automatically charging aircraft machine guns.

Certain types of military aircraft are provided with one or more fixed machine guns located in the wings, in parts of the landing gear or in the fuselage at points which are somewhat remote from the aircraft pilot or gunner. The guns are provided with remote trigger means which, in modern installations, are actuated by a solenoid at the trigger controlled by a switch usually mounted on the control stick of the airplane. In the operation of machine guns, a reciprocable charging slide is provided which initially must be pulled back and released to feed the initial cartridge from the ammunition belt into the gun. Thereafter, holding of the trigger automatically permits ejection of the used cartridge and feeding of another to the gun chamber. These guns, though normally one hundred percent operative when absolutely perfect ammunition is used, are at times likely to jam, due to defective ammunition or other causes. Upon such jamming, the automatic gun operation, of course, ceases, and most gun jams may be corrected by manually operating the charging slide to extract the misfired cartridge and to feed a new one into the gun, after which automatic operation may again maintain. Certain jams or misfires may not be correctible by recharging, but the majority of them are. When guns are remotely located from the pilot or gunner, it becomes necessary to provide a remote charging control which has been in the form of a cable attached to the gun slide, running over pulleys to a suitable charging handle in the pilot's or gunner's compartment. When the gun jams, or when it is desired to initially charge the gun, this handle may be pulled and released. During combat, when the pilot or gunner is busily occupied with a variety of duties, it becomes difficult to notice whether or not the gun has jammed in operation, and the short time necessary for ascertaining this fact, and for manually recharging the gun, is at a premium. It therefore becomes desirable to provide means for automatically recharging the machine gun in case of cessation of its fire, occasioned by jamming, misfire, or the like. It is therefore an object of this invention to provide means for automatically recharging a machine gun, responsive in its operation to cessation of operation of the gun.

A further object is to provide alternative forms of automatic gun recharging apparatus, one of which is operated electrically, and the other of which is operated pneumatically.

Still another object is to provide visual indicating means by which the jamming of the gun may be readily ascertained.

Still another object is to provide visual indicating means by which the complete expenditure of the ammunition for any particular gun may be shown.

A further object is to provide a power means for recharging the gun and to provide means responsive to cessation of gun operation for actuating said power means.

Further objects of the invention will become apparent in reading the specification and claims and in viewing the drawings, in which:

Fig. 1 is a diagrammatic view of a machine gun having electrically controlled pneumatic automatic gun recharging means;

Fig. 2 is an enlarged elevation, partly in section, showing the pneumatic component of the gun recharger;

Fig. 3 is a section on the line 3—3 of Fig. 2;

Figure 4:
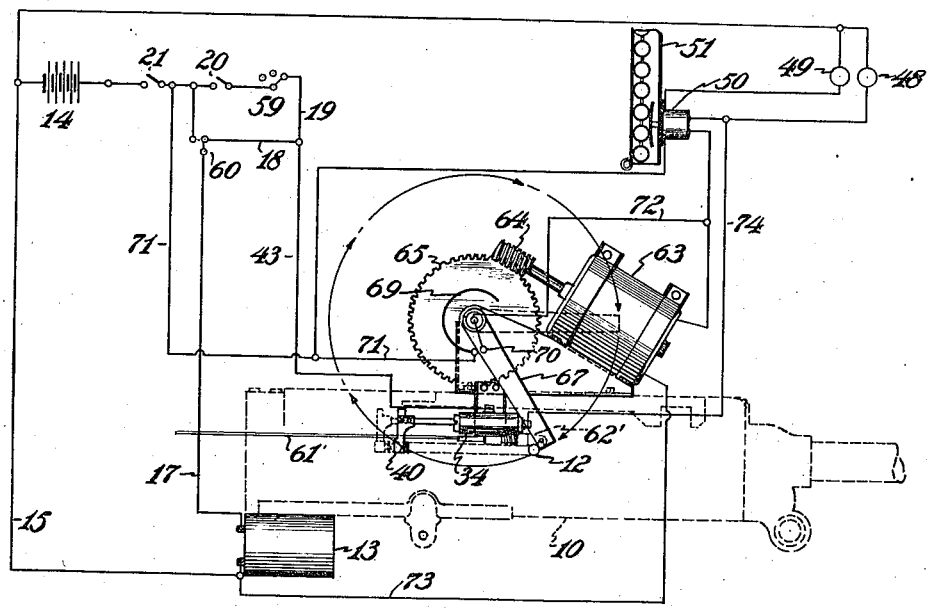
Fig. 4 is a diagrammatic view showing an alternative organization of an electrical automatic gun recharger as applied to a machine gun.
Figure 5:
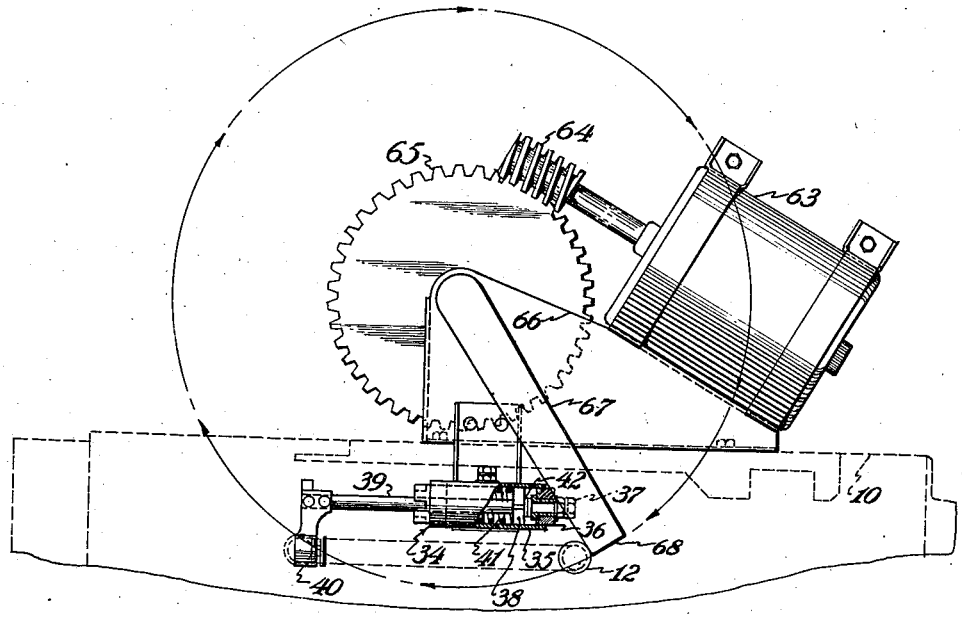
Fig. 5 is an enlarged diagrammatic view of the motor and recharging arm of the embodiment of Fig. 4.

The devices of this invention are particularly applicable to machine guns such as 10, in Figs. 1, 4 and 5, in which a slot 11 is formed in the gun breech, within which a slide having a gun recharging handle 12 is adapted to reciprocate. Such guns may be operated either by recoil or by gas pressure, to automatically actuate the extracting, feeding and firing mechanism. When the handle 12 is in its normal forward position, the gun is charged and ready for firing upon actuation of the trigger. Upon firing, the handle 12 is thrown rearwardly in the slot 11 to the position 12' and is returned by spring pressure to the forward position at 12. The normal rate of fire of guns of this character ranges from 600 to 1200 rounds per minute.

The gun includes a trigger solenoid 13 and a circuit comprised by the battery 14, the wires 15, 16, 17, 18, 19, the trigger switch 20 and the safety switch 21.

The automatic recharging apparatus comprises generally, a compressed air tank 22 which may be charged by a hand operated pump 23, the tank being coupled through a connection 24 to a three-way valve 25. This valve has positions, as shown in Fig. 2, wherein a connection 26 is connected either to the airline 24 or to the atmosphere at 27. The connection 26 is coupled to a cylinder 28 having a spring-pressed piston 29 and a piston rod 30 extending through the cylinder to a fitting 31 provided with a hook 32 aligned for engagement with the handle 12. When the valve 25 is moved to permit air pressure in the connection 26, air passes through the cylinder end to move the piston to the left, as shown; thereupon, the hook 32 engages the handle 12 and throws it rearwardly of the gun, or to the left, as shown. The valve 25 is electrically controlled by a solenoid 33 in circuit with a control switch 34 mounted on the gun. This switch, which is similar for this pneumatic embodiment of the charger and also for the electrical embodiment, is shown in detailed construction in Fig. 5, and comprises a small cylinder 35 having a closed insulating end 36 with a contact 37. Within the cylinder, a perforate piston 38 is slidable, the piston having a rod 39 extending rearwardly of the gun and carrying a fitting 40 adapted to be engaged by the charging handle 12 when the latter approaches the rearward extreme of its stroke. The piston and cylinder combination provides an air-containing dashpot by which rapid reciprocation of the piston is limited to a frequency considerably less than the normal rate of fire of the machine gun. As will be seen in Fig. 5, the piston 38 is normally urged to a forward position by a spring 41, and the piston carries an electrical contact 42 adapted to engage with the contact 37. In the actual embodiment of this organization, the piston with its attached parts has a reciprocating movement of about three-eighths of an inch, whereas the charging handle 12 has a considerably greater amount of movement. During automatic gun operation, the handle 12 reciprocates rapidly and on its first rearward movement strikes the fitting 40, separating the contacts 42 and 37. As the handle 12 moves forwardly and subsequently reciprocates at a high rate, the dashpot formed within the device 34 prevents the piston from moving to its extreme forward position in the time interval allowed, whereby the contacts 42 and 37 may not again engage. Should the gun cease firing for any reason, the spring 41 will urge the piston 38 forwardly, causing the contacts 42 and 37 to engage. Such engagement, through the electrical circuit involved by the battery 14, the switches 20 and 21, and the wires 19, 43, 44, 45, 46, 47 and 15, energizes the solenoid 33 which operates the valve to open said valve and supply pressure to the cylinder 28. Thereupon, the gun is pneumatically recharged and as the handle 12 approaches its rearwardmost position, the circuit just outlined is broken through the device 34, and the valve 25 is turned to its off position wherein the cylinder is placed in communication with the atmosphere in the valve position as shown in Fig. 2. Thereupon, the gun may continue to operate automatically and, as previously outlined, the circuit controlled by the device 34 is broken, by which the pneumatic recharging device is carried out of operation until the gun may again jam. It will be noted that the trigger switch 20 and/or the safety switch 21 serves to break the circuit both for the trigger mechanism and for the recharging mechanism.

Figures 7, 8, 9:
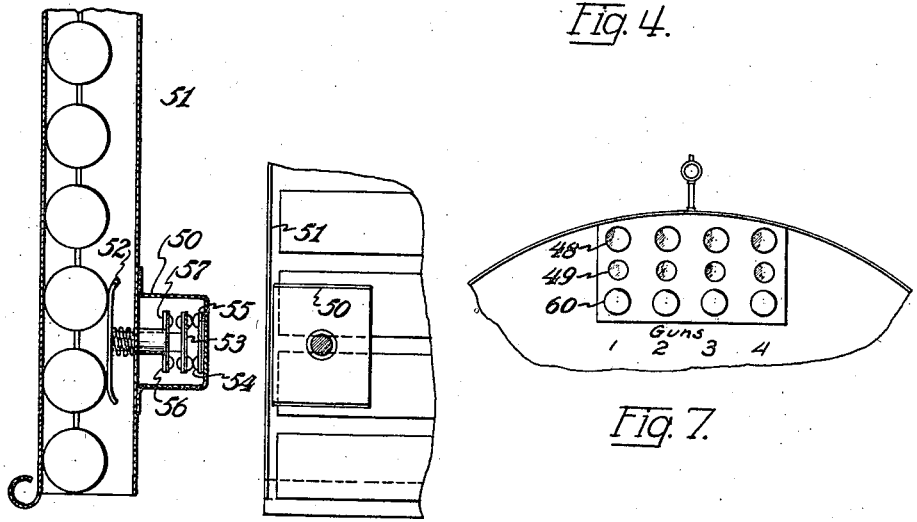
Fig. 7 is a diagram of the indicating signals, applicable to either embodiment of the gun recharger, to indicate gun jams or ammunition expenditure for a plurality of machine guns equipped with the devices of this invention.
Fig. 8 is a plan of the switching apparatus used for the indication of ammunition expenditure, as applied to the ammunition feed chute.
Fig. 9 is a section through the ammunition feed chute showing the switch for controlling the indication of ammunition expenditures.

We also provide an indicating device in the form of an amber light 48 in circuit with the recharging control switch device 34, so that when the switch in said device is closed, the amber light will form a visual indication to the gunner or pilot that the gun is jammed. Such light, however, will immediately go out upon actuation of the recharging device, and as the gun continues to fire consecutively, the light stays out. Should the gun jam be of such character that the automatic recharging apparatus cannot clear it, the amber light will stay lit. We also provide a light 49, preferably red, controlled by a switch 50, shown in detail in Fig. 9, by which complete expenditure of ammunition for the gun is indicated. The switch 50, attached to the ammunition feed chute 51, comprises a strip 52 adapted to contact ammunition in the feed chute. When the strip 52 is moved to the right, as shown, by the presence of ammunition, a switch arm 53 completes the circuit between switch points 54 and 55 in series with the wires 45 and 46, by which the gun recharging circuit is completed. The switch 50 is further provided with contacts 56 and 57 in circuit with the red light 49, and a wire 58 connected adjacent the safety switch 21. Thus, when there is no ammunition in the chute 51, the red light 49 is lit and the circuit for automatic gun recharging is broken, so that the recharger cannot operate. As soon as ammunition is present in the chute, the circuit for the lamp 49 is broken and the circuit for the gun recharger is completed.

We also provide a selector switch 59 by which the battery 14, the safety switch 21 and the trigger switch 20 may be selectively connected to operate a plurality of machine guns each equipped with the recharging device shown. Normally, such a selector switch would be organized to have selective positions for salvo firing of, for instance, four guns, or for selective firing of the two inner guns or of the two outer guns.

We also provide a two-way switch 60 having a normal position, as shown in Fig. 1, connecting the power circuit directly to the trigger solenoid 13 through the wire 17, by which arrangement automatic operation of the recharging mechanism is permitted. The switch 60 may, however, be depressed to connect the power source directly with the wire 18 which will then control the recharging apparatus directly, while holding the trigger solenoid 13 out of circuit. The purpose of this switch is to permit of the gun recharging mechanism to be operated selectively rather than automatically, should there be a gun jam, or should a new charge of ammunition be provided for the gun. If, for instance, the amber light 48 is lighted and the gun fails to fire by virtue of the automatic recharging mechanism, the switch 60 may be depressed to positively operate the recharging mechanism to charge the gun, whereupon the amber light 48 should go out and the gun should be ready for firing.

A manual recharging control 61 may be provided, if desired, this comprising a cable connected as at 62 to the fitting 31; the latter, as previously mentioned, has a hook 32 directly engaging the recharging handle 12.

Figure 6:
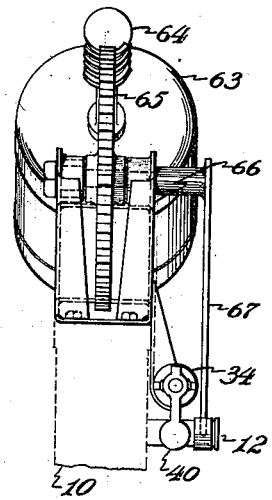
Fig. 6 is a front elevation of the mechanism of Fig. 5.

The second embodiment of the invention shown in Figs. 4, 5, and 6 includes certain units common to the previous embodiment just described, and the circuit arrangements also contain certain common features. Those elements similar to the pneumatic recharger will be designated by the same numbers.

In this embodiment, in place of the pneumatic apparatus involving the elements 22 to 33, inclusive, we provide an electric motor 63 having a worm 64 engaging a worm wheel 65 borne in a bracket 66 mounted atop the gun 10. The shaft of the worm gear 65 carries an arm 67, the length of said arm and the position of the shaft center being such that the end 68 of the arm may engage the recharging handle 12 when the latter is in its forwardmost position. Upon energizing of the motor, the arm swings in a clockwise direction, as shown, and pushes the recharging handle 12 rearwardly until the latter is substantially at its extreme rearward position. Thereupon, the end of the arm 67 slides off the handle, permitting the latter to move forwardly again, while the arm continues to rotate.

The bracket 66 is provided with a segmental contact piece 69 with which a contact 70 mounted either on the wheel 65 or on the arm 67 may at times engage. The apparatus is so connected electrically, that the motor circuit is primarily controlled by the switch formed by the elements 69 and 70, through the wires 71, 72, 73 and 15. However, the segmental switch embodying the elements 69 and 70 does not make contact through part of the rotation of the arm 67. Therefore, the switch mechanism 34, similar to that used in the pneumatic recharger, serves to short circuit the switch involving the elements 69 and 70 to start the motor 63, after which starting, the elements 69 and 70 engage and carry on motor operation until the elements 69 and 70 sever contact. It will be noted that the switch device 34 is connected by means of the wires 43 and 74 to points in the circuit adjacent the wires 71 and 72. In operation, the switch device 34 acts as a starting switch for the motor upon jamming of the gun. This circuit holds until the charging handle 12 on the gun engages the fitting 40 of the device, breaking engagement of the contacts 37 and 42. However, in the interval that these elements were in contact, the motor will have turned the wheel 65 until the points 69 and 70 are engaged, thus causing the motor to continue to rotate until the elements 69 and 70 disengage. In the interim, recharging of the gun will have started and, if the trigger switch 20 is depressed, the gun will have started automatic operation. The normal raised position for the arm 67, when the motor 63 is not operating, will be approximately that shown by dotted lines in Fig. 4.

In the electrical organization above described, we embody the same safety features involving the amber lamp 48 and the red lamp 49, respectively controlled by the automatic charger and by the feed chute switch 50. We likewise provide the selector switch 59 in the electrical embodiment for selectively controlling the operation of a plurality of guns. The functional operation of the electrical embodiment will be identical with that previously described in the pneumatic embodiment. Both include the plunger switch 60 by which gun recharging may be controlled without reference to the trigger. We also provide a manual recharging cable 61' with its charging handle engaging a fitting 62' should the automatic devices fail to function.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. In a charging mechanism for a machine gun having a bolt reciprocable during gun operation, a dashpot having a plunger reciprocable at a normal frequency less than the frequency of reciprocation of said bolt, said plunger having an element adapted to be contacted and moved by said bolt during gun operation, a switch controlled by said dashpot organized to be opened by said plunger when being repeatedly operated on by said bolt and organized to be closed when said bolt ceases to operate on said plunger, and means controlled by closure of said switch for positively initiating reciprocation of said bolt.

2. In a charging mechanism for a machine gun having a bolt reciprocable at a relatively high rate during gun operation, a lever mounted on said gun rotatable to engage said bolt and to reciprocate same in one direction, power means for rotating said lever, a switch comprising a cylinder, a spring-pressed piston therein adapted for relatively slow reciprocation and to be engaged and moved during bolt reciprocation, electrical contacts carried respectively by said piston and cylinder organized to be separated upon movement of said piston by said plunger, said contacts being in circuit with said power means to initiate operation of said power means upon engagement of said contacts by cessation of bolt reciprocation.

3. In a charging mechanism for a machine gun having a bolt reciprocable at a relatively high rate during gun operation, a cylinder mounted on the gun having a piston including a hook engageable to move said bolt, means to supply fluid under pressure to said cylinder for traversing said piston to move said bolt, a piston and cylinder dashpot assembly mounted on said gun, said assembly comprising a switch, the piston of said assembly being arranged for contact by said bolt upon reciprocation thereof to open said switch, a valve actuated by closure of said switch to admit fluid pressure to said first named cylinder, and switch means responsive to the presence of an ammunition supply in the gun feed chute for closure thereof, in series with said first switch for rendering said valve operative.

4. The combination with a machine gun having a bolt reciprocable during gun operation, of a recharging mechanism, an electrical circuit operable upon completion thereof to operate said recharging mechanism, a switch in said circuit, means for closing said switch responsive to cessation of bolt reciprocation, and a second switch in series with said circuit responsive in its closure to the presence of ammunition in the gun feed chute.

5. An automatic charger for a machine gun, the gun including a reciprocable charging member, comprising a member rotatably mounted on the gun and so placed with respect to the charging member as to engage same during one segment of its rotation, motor means for turning said arm to reciprocate said charging member, and a device responsive to cessation of gun firing for energizing said motor means.

6. An automatic charger for a machine gun, the gun including a reciprocable charging member, comprising a member rotatably mounted on the gun and so placed with respect to the charging member as to engage same during one segment of its rotation, motor means for turning said arm to reciprocate said charging member, a device responsive to cessation of gun firing for energizing said motor means, and means operative after said arm has been rotated through said segment for de-energizing said motor means.

7. In a mechanism for use with a machine gun having a bolt reciprocable to automatically recharge the gun in response to normal gun functioning, said bolt having a forward rest position assumed upon cessation of gun fire, an element organized for contact with and reciprocation by said bolt toward the rearward end of the path of bolt reciprocation, means for urging said element forwardly, means for restricting the speed of forward movement of said element so that the time for forward movement is greater than the time for a normal cycle of bolt operation during gun fire, a switch closable in response to extreme forward movement of said element, and a motor energizable by switch closure to move said bolt from its forward to its rearward position.

8. In a mechanism for use with a machine gun having a bolt reciprocable to automatically recharge the gun in response to normal gun functioning, said bolt having a forward rest position assumed upon cessation of gun fire, an element organized for contact with and reciprocation by said bolt toward the rearward end of the path of bolt reciprocation, means for urging said element forwardly, means for restricting the speed of forward movement of said element so that the time for forward movement is greater than the time for a normal cycle of bolt operation during gun fire, a switch closable in response to extreme forward movement of said element, a motor energizable by switch closure to move said bolt from its forward to its rearward position, an ammunition feed chute for the gun, and a switch in said chute, in series with said first switch, organized to be closed when ammunition is present in the chute.

9. In combination with a machine gun including a charging member movable during automatic gun operation and movable manually to charge the gun, a driven device engageable at times for moving said charging member, said device being normally out of contact with the member, motor means for driving said device into contact with said member for moving the latter, and a mechanism having an element movable at a slower rate of speed than the normal speed of operation of said charging member, whereby the time for movement of said element to an extreme position is greater than the time for a single complete cycle of operation of said charging member during gun operation, to prevent extreme movement of said element during normal gun operation, said element having switch means for energizing said motor means, closable upon extreme movement of said element due to cessation of movement of the charging member and consequently, due to cessation of contact between the charging member and said element.

10. In combination with an automatic machine gun including a charging member reciprocable during automatic gun operation at a finite speed rate, an initial charging element reciprocable to move said member and normally out of engagement therewith, power means for reciprocating said element; a plunger, having damping means, positioned for cyclic engagement by said charging member and having a range of motion greater than that permitted by automatic gun operation due to the plunger damping means and the cyclic engagements of the charging member with said plunger, said plunger being movable through the extra range of motion upon cessation of gun firing due to cessation of cyclic engagements with the charging member, and means actuated by movement of said plunger into said extra range of motion to energize said power means for reciprocating said element.

11. In a gun charging mechanism for machine guns having a member oscillatable during gun operation, a contact element resiliently urged toward said member and adapted to be contacted thereby during each stroke thereof, a dashpot associated with said element for delaying movement thereof between successive contacts of said member with said element, said element being movable due to resilient urging, to an extreme position without the normal range of movement thereof during contacts with the member upon cessation of member reciprocation, power means for charging said gun, and a device located for contact by said element when the latter is in said extreme position, said latter contact comprising with said element and device, actuating means for said power means.

12. In a charging mechanism for a machine gun having a bolt reciprocable during gun operation, an electric switch including delay action resilient means for urging the switch toward a closed position, said switch having an element engageable by said bolt for holding the switch open due to bolt reciprocation during normal gun operation, and a power unit in circuit with said switch adapted to be activated thereby when said switch is urged to a closed position by said delayed action resilient means upon cessation of bolt reciprocation, and means operated by said power unit for positively moving said bolt to recharge the gun.

RAYMOND C. BLAYLOCK.
CLEM G. TRIMBACH.